Figure 1:
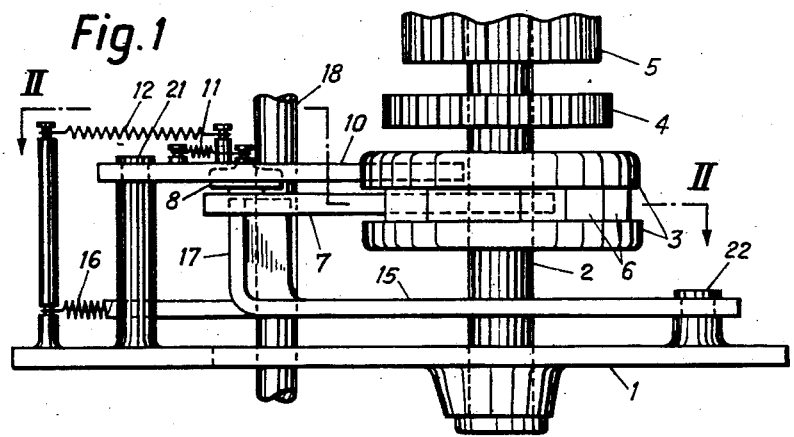

May 9, 1961 A. RUTISHAUSER 2,983,156
COUPLING DEVICE
Filed Aug. 11, 1958 4 Sheets-Sheet 1

ALBERT RUTISHAUSER
INVENTOR.

BY *Arnold Robertson*

ATTORNEY

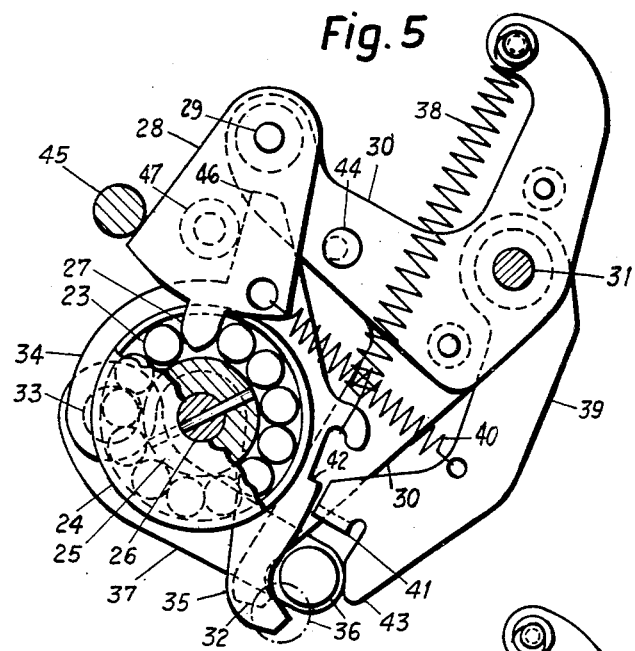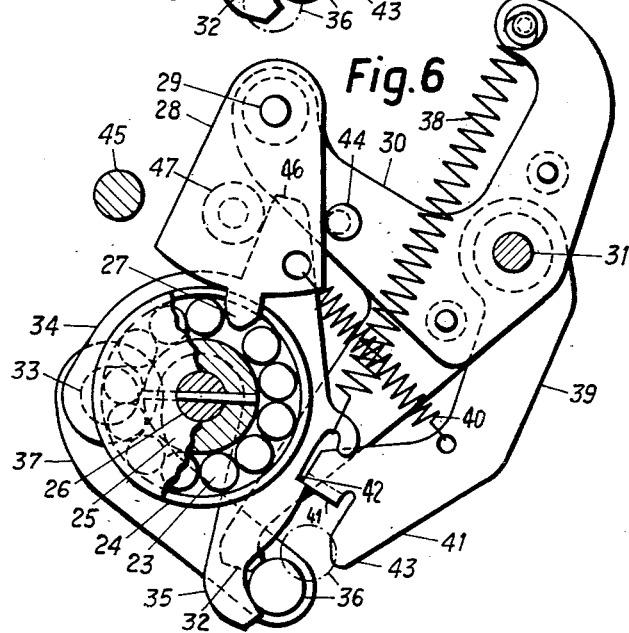

May 9, 1961 A. RUTISHAUSER 2,983,156
COUPLING DEVICE
Filed Aug. 11, 1958 4 Sheets-Sheet 4

ALBERT RUTISHAUSER
INVENTOR.

BY

ATTORNEY

United States Patent Office 2,983,156
Patented May 9, 1961

2,983,156
COUPLING DEVICE
Albert Rutishauser, Stockern, Uerikon,
Zurich, Switzerland
Filed Aug. 11, 1958, Ser. No. 754,397
Claims priority, application Switzerland Sept. 15, 1954
9 Claims. (Cl. 74—141.5)

This invention relates to a coupling device and is more particularly directed to a coupling device of a type which is particularly suitable for use in calculating and accounting machines.

The present application is a continuation-in-part of my co-pending patent application Ser. No. 534,033, filed September 13, 1955, now Patent No. 2,855,785.

An object of the present invention is to provide a device capable of transforming an oscillatory movement into a step-by-step rotary motion.

Another object of the present invention is to provide a coupling device for connecting an oscillating member with a rotary transmitting shaft.

The above, and other objects of the present invention will become apparent in the course of the following detailed description of illustrative embodiments thereof when read in connection with the accompanying drawings.

Figure 2:
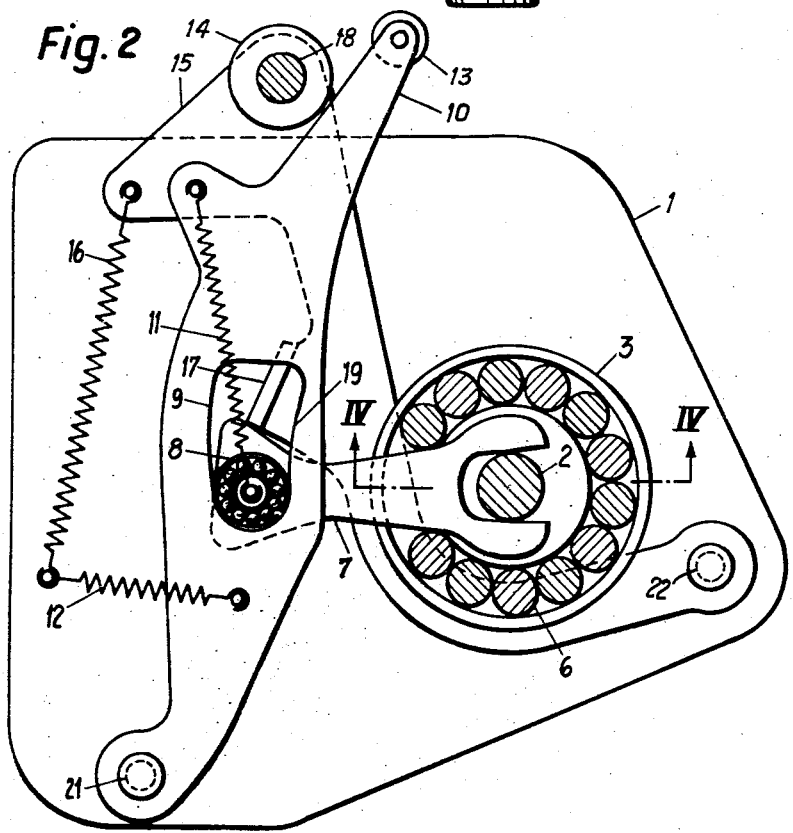
Figure 3:
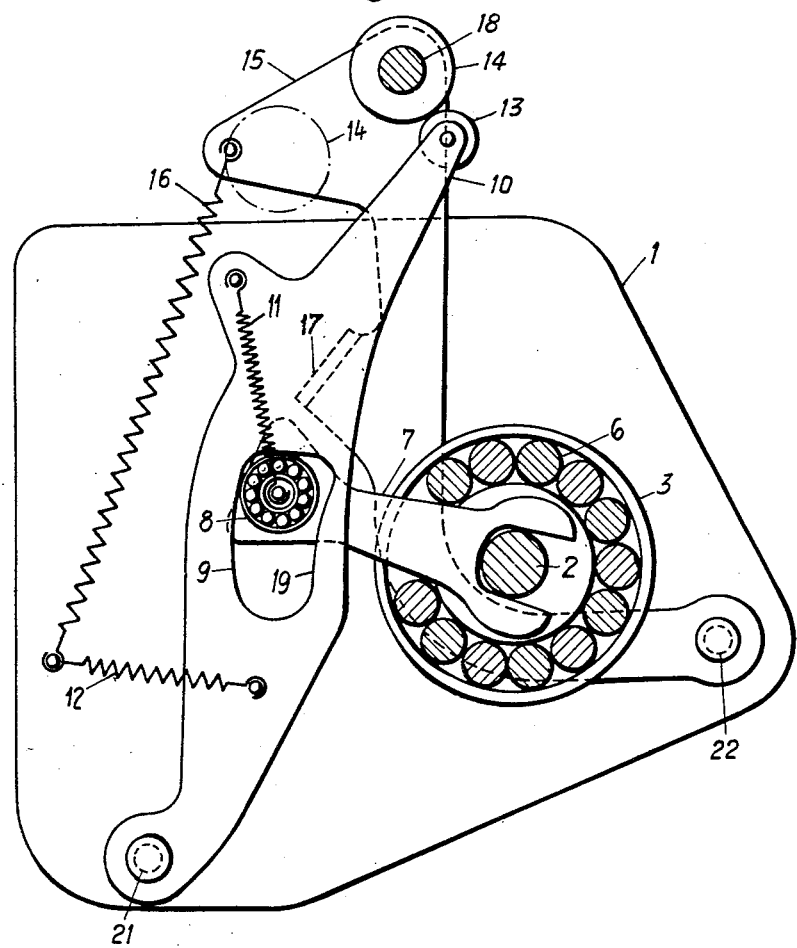
Figure 4:
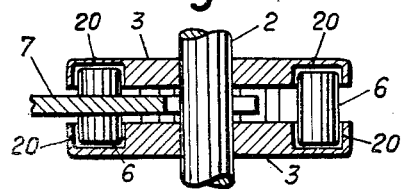
Figure 7:
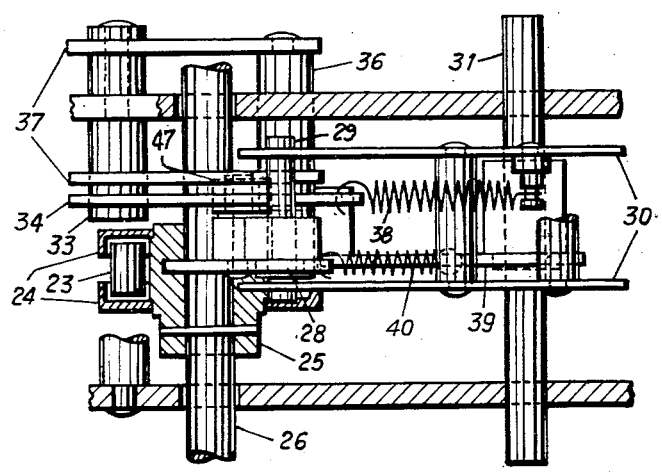

In the drawings:

Fig. 1 is a plan view of a coupling device embodying the invention,

Figs. 2 and 3 are sectional views taken along line II—II in Fig. 1, and showing the coupling device in two different operating positions, Fig. 4 is a detailed sectional view taken along line IV—IV in Fig. 2, Figs. 5 and 6 are side elevational views of a further embodiment of the invention in the form of coupling device with the parts of the latter being shown in two different positions and partly in section, and Fig. 7 is a plan view of the embodiment according to Figs. 5 and 6, shown partly in section.

Referring to the drawings in detail, and initially to Figs. 1 to 4 thereof, it will be seen that a coupling device embodying this invention includes a plate 1 supporting a transmitting shaft 2 on which two axially displaced clutch discs 3, a gear wheel 4 and a ratchet wheel 5 are fixedly secured. The clutch discs 3 each have two side faces and an annular groove 20 (Fig. 4) in the one of said faces facing toward the other clutch disc so that the grooves 20 open towards each other and have the same radii and equal cross sections. The grooves 20 together define an annular cage designed to hold a plurality of rolling members, such as rollers 6. Arranged between the two clutch discs 3 and two adjacent rollers 6 is a key member 7 which has forked portions straddling the shaft 2 and is displaceably supported thereon. The portion of key member 7 extending between the rollers 6 is in the form of a wedge and tapers in a direction away from the shaft 2. Rotatably mounted on the key member 7 is a roller 8, which may be in the form of a ball-bearing, as shown. The roller 8 engages in a slot 9 in a control lever 10 which is pivotally mounted on plate 1, as at 21. A spring 11 has one end attached to the control lever 10 and the other end attached to the shaft of roller 8 and tends to turn the key member 7 in the clockwise direction relative to shaft 2. Another spring 12 is attached, at one end, to the control lever 10 and has its other end connected to plate 1. The spring 12 tends to turn the control lever 10 in the counter-clockwise direction about pivot 21. Arranged on control lever 10 is a roller 13 which is engageable with a roller 14 mounted on a shaft 18 supported by a carrier lever 15. The carrier lever 15 is pivoted on a pivot 22 carried by plate 1 and is urged to turn in the counter-clockwise direction by means of a spring 16 attached to the plate 1. A control arm 17 extends from carrier lever 15 and can act on the key member 7.

The operation of the above described embodiment of the invention is as follows:

The idle position of the coupling device is shown in Fig. 2. The spring 12 exerts a force on the control lever 10 tending to turn the latter in the counter-clockwise direction and, by means of roller 8, a force directed radially away from the shaft 2 is transmitted to the key member 7 which, owing to the wedge action of its central portion, forces apart the adjacent rollers 6 in a circumferential direction. The rollers 6 are thereby forced outwardly against the outer peripheral wall of the cage defined by groove 20 in the clutch discs 3 and cause a frictional connection between the rollers 6 and the clutch discs 3. Since key member 7 is located between the rollers 6, rotation of key member 7 about the shaft 2 will positively cause a rotation of the clutch discs 3.

The carrier lever 15 is then pivoted by a force exerted on shaft 18 in a manner not shown, from the extreme position thereof shown in Fig. 2 to the other extreme position of Fig. 3.

When the carrier lever 15 starts to turn in the clockwise direction, no other member will move for a moment. The key member 7, which is subject to the action of spring 11 and thus tends to follow the movement of the control arm 17 of lever 15, is initially retained in the position of Fig. 2 by the action on the roller 8 of a cam 19 formed along an edge of the slot 9. When the carrier lever 15 is turned further, the roller 14 engages roller 13 and forces the control lever 10 to the right in a clockwise direction into the position shown in Fig. 3. The roller 8 is forced to the right by the slot edge remote from edge cam 19 so that the key member 7 is displaced in a radial inward direction from its previously described locking position. The rollers 6 are thereby released from frictional engagement with the clutch discs 3 and can move freely within them in the circumferential direction to the extent permitted by the key member 7. The cam 19 releases roller 8 when the control lever 10 is pivoted in the clockwise direction and the roller 8 moves to the position shown in Fig. 3 under the action of spring 11, while taking along the key member 7 and the rollers 6 to the positions of Fig. 3 from the positions of Fig. 2. In order to prevent any turning of the clutch discs 3 and of the shaft 2 in the clockwise direction during the described movement of key members 7 and rollers 6, a pawl (not shown) acting on the ratchet wheel 5 will then become operative.

When the carrier lever 15 is pivoted in the counter-clockwise direction from its extreme position shown in Fig. 3, the roller 13 is first released by the roller 14 and the lever 10 is turned in the counter-clockwise direction by the spring 12. The roller 8 is pulled to the left and correspondingly displaces the key member 7 which displaces the rollers 6 circumferentially in the annular grooves 20 into locking relation with respect to the outer peripheral walls of the cage so that the clutch discs 3 are again fixed with respect to the key member 7. Further counter-clockwise pivoting of the carrier lever 15 causes the control arm 17 to bear on the key member 7 and thus turn the shaft 2 until the idle position shown in Fig. 2 is again restored.

This cycle is repeated during each oscillation of the carrier lever 15, and thereby effects step-by-step rotation of the shaft 2.

In the embodiment according to Figs. 5 through 7 a cage for rolling members such as rollers 23 is defined between two discs having grooves opening axially toward each other and forming a housing portion 24 extending from a hub portion 25 on a rotatable transmitting shaft 26. Extending in the radial directional between two of the rollers 23 in the cage is a key portion 27 on a pivoted key member 28. The key portion 27 tapers in the direction toward the transmitting shaft 26. The key member 28 can be pivoted to move portion 27 substantially tangential to the ring of rollers 23 about a pivot 29 arranged on a pair of three-armed control levers 30 which in turn are pivoted on a stationary shaft 31.

Arranged on another stationary shaft 33 is an actuating lever 34 for the key member 28. The actuating lever 34 has a hooked portion 35 adapted to engage a pin 36 carried by arms which are also pivotally arranged on the shaft 33. Connected between the actuating lever 34 and the control levers 30 is a tension spring 38. Pivoted on the shaft 31 is a pawl lever 39 which is connected, by means of a tension spring 40, with the key member 28 and which has a lug 41 engageable with a notch 42 in the actuating lever 34. A projection 43 on the pawl lever 39 is also engageable with the pin 36.

The operation of the embodiment of the invention described above with reference to Figs. 5 through 7 is as follows:

The arms 37 are oscillated about their pivoted 33 in a manner not shown between two extreme positions respectively indicated by the full and dot-dashed representations of pin 36 on Fig. 5.

The actuating lever 34 is held in the position indicated by full lines in Fig. 6 by engagement of the hook portion 35, with pin 36, and the spring 38 is tensioned. Under the action of spring 40, the pawl lever 39 is displaced so that the lug 41 engages notch 42. The ends 32 of the three-armed control levers 30 engage the pin 36 and, upon pivoting of the control levers 30, cause the key portion 27 to be withdrawn from the gap between the rollers 23, with the spring 40 pulling the key member 28 against a cam stop 44 on one of the control levers 30. With the parts in the position shown in Fig. 6, the hub portion 25 and shaft 26 can rotate freely relative to the rollers 23.

When the arms 37 are pivoted in the counter-clockwise direction from the position shown in Fig. 6, the ends 32 of the three-armed control levers 30 are released from engagement with the pin 36 and permit the levers 30 to be turned by spring 38 so that the key portion 27 moves between the adjacent rollers 23 forcing them apart in the circumferential direction of the roller ring and thereby causing the housing portion 24 and the hub 25 and shaft 26 to be coupled with the key member 28.

At the end of the movement of arms 37 the pin 36 forces the lug 41 from the notch 42 by engagement of the pin 36 with the projection 43 so that the actuating lever 34 is pivoted about the shaft 33 in the counter-clockwise direction by the action of spring 38. During such counter-clockwise movement, an arm 46 on lever 34 acts upon a roller 47 arranged on the key member 28, and the latter is pivoted against a fixed stop 45 and thus turns the roller cage coupled with the key member 28 and the shaft 26 through a certain angular extent into the position shown in Fig. 5.

When arms 37 are moved in one direction, the shaft 26 rotates step-by-step in the counter-clockwise direction with the key member 28. When arms 37 are moved in the other direction, the key member 28 releases the fixed connection between it and the parts 23, 24, 25, 26, and the key member 28 only drives the rollers 23 while moving in the clockwise direction.

The rollers shown in the illustrated embodiments of the invention may be replaced by balls.

The essential advantage of the present invention is that despite the small dimensions of the locking or coupling mechanism very large torques may be transmitted e.g. in transmitting large control forces, particularly in calculating and accounting machines.

Having thus described the invention, what is claimed as new and desired to be secured by Letters Patent, is:

1. A coupling device comprising a rotatable transmitting shaft, two axially spaced clutch discs secured on said shaft for rotation therewith, said clutch discs each having two side faces and annular grooves in the confronting side faces of said clutch discs, said annular grooves having equal radii and cross sections, said grooves defining together a cage having an outer peripheral wall with a central circumferential slot therein, a plurality of rolling members arranged in said cage and bearing against said outer peripheral wall, a displaceable key member projecting through said circumferential slot between said clutch discs and between two of said rolling members, said key member being radially movable relative to said transmitting shaft between engaged and disengaged positions, a control lever hingedly connected to said key member for displacing said key member in a radial direction between said engaged and disengaged positions, said key member, when in said engaged position, urging said two rolling members apart in a peripheral direction with respect to said annular grooves and into locking relation with respect to said outer peripheral wall of said cage, whereby said rolling members are locked against movement in said cage to couple said key member with said rotatable transmitting shaft by way of said rolling members and said cage.

2. A coupling device comprising a rotatable transmitting shaft, clutch means secured on said shaft for rotation therewith and including two axially spaced disc members each having two side faces and annular grooves in their confronting side faces opening axially toward each other and formed with equal radii, said grooves defining together a cage having a radially outward opening circumferential slot, a plurality of rolling members arranged in said cage, a key member projecting through said circumferential slot between said disc members and between two of said rolling members, said key member being movable in radial and peripheral directions relative to said transmitting shaft, a control lever hingedly connected to said key member for displacing said key member in said radial direction between an engaged position, where said two rolling members are urged apart in the circumferential direction with respect to said cage, thereby to lock said rolling members relative to said cage, and a disengaged position where said rolling members are free to roll in said cage, and a carrier lever co-operating with said control lever for displacing said key member in said peripheral direction to sway said key member relative to said transmitting shaft from a first to a second extreme position, and thereby to transmit an angular movement to said clutch means and said shaft when said key member is in said engaged position.

3. A coupling device comprising a rotatable transmitting shaft, two axially spaced clutch discs secured on said shaft for rotation therewith, said clutch discs each having two side faces and annular grooves in their confronting side faces opening axially toward each other and formed with equal radii and equal cross sections, said grooves defining together an annular cage having an outer peripheral wall with a central circumferential slot therein, a plurality of rolling members arranged in said cage and bearing against said outer peripheral wall, a displaceable key member projecting through said circumferential between said clutch discs and between two of said rolling members, said key member being movable in radial and peripheral directions relative to said transmitting shaft, spring means urging said key member in a first peripheral direction from a second to a first extreme position, a control lever for displacing said key member in said radial direction between an engaged position, where said two rolling members are urged peripherally apart to lock said rolling members against said outer peripheral wall of the cage and thereby couple said key member with said transmitting shaft, and a disengaged position where said rolling members are free to roll in said cage, said key member being hingedly connected to said control lever, and a carrier lever cooperating with said control lever for displacing said key member in a second peripheral direction reversed to said first peripheral direction to sway said key member relative to said transmitting shaft from said first to said second extreme position, and to transmit an angular movement to said transmitting shaft when said key member is in said engaged position.

4. A coupling device according to claim 3 wherein said rolling members are arranged in a single circular row, and said key member has a portion between said two rolling members and tapering in a direction away from said transmitting shaft, said key member being radially displaced in a direction away from said shaft into said engaged position for locking said rolling members with respect to said cage and said shaft when said key member is coupled through said rolling members with said shaft.

5. A coupling device according to claim 4 wherein said key member has a forked portion straddling said shaft.

6. A coupling device according to claim 3 wherein said key member has a portion between said two rolling members and tapering in a direction toward said transmitting shaft, said key member being radially displaced in a direction toward said shaft into said engaged position for locking said rolling members with respect to said cage and thereby coupling said key member to said shaft by way of said rolling members and cage.

7. A coupling device comprising a rotatable transmitting shaft, clutch means secured on said shaft defining an annular cage having an outer peripheral wall with a circumferential slot opening therethrough, a series of rolling members in said cage and bearing against said outer peripheral wall, a key member extending through said slot and having a tapering portion in said cage between two of said rolling members, means supporting said key member for generally radial movement with respect to said shaft between an engaged position in which said tapering portion urges apart said two rolling members and locks said series of rolling members against said outer wall of the cage, thereby to couple said key member to said shaft by way of said rolling members and cage, and a disengaged position in which said rolling members are free to roll in said cage, means for rocking said key member so that said tapering portion of the latter moves generally peripherally with respect to said cage, and means coordinating the rocking and radial movements of said key member to dispose the latter in said engaged position during rocking of said key member in one direction and to dispose the key member in its disengaged position during rocking in the opposite direction, whereby rocking of said key member causes step-by-step rotation of said transmission shaft.

8. A coupling device comprising rotatable transmitting means, annular cage means operatively connected to said transmitting means for rotation therewith and having an outer peripheral wall with a central, circumferential slot opening radially through said wall, a circularly arranged succession of rolling members arranged for rolling movement in said cage means and bearing against said outer wall, displaceable key means projecting through said circumferential slot between two of said rolling members, and means for displacing said key means radially with respect to said transmitting means to urge said two rolling members apart in a peripheral direction with respect to said annular cage means whereby the successive rolling members are locked against each other and against said peripheral wall to prevent movement of said rolling members in said cage means, thereby to couple said transmitting means with said key means through said rolling members and cage means.

9. A coupling device comprising a rotatable transmitting shaft, clutch means secured on said shaft for rotation therewith and including two axially spaced disk members each having two side faces and annular grooves in the confronting side faces of the disk members, said grooves opening axially towards each other and formed with equal radii, said grooves together defining a cage having an outer peripheral wall with a central circumferential slot opening radially in said wall, a circularly arranged sucession of rolling members arranged in said cage to bear against said outer peripheral wall, a key member projecting through said slot between said disk members and between two of said rolling members, said key member being movable in a radial direction relative to said transmitting shaft between an engaged position, where said two rolling members are moved peripherally apart in said cage to lock the successive rolling members relative to each other and relative to said outer wall of the cage, and a disengaged position, where said rolling members are free to rotate in said cage, and means for moving said key member in said radial direction.

References Cited in the file of this patent

UNITED STATES PATENTS

| 1,076,030 | Ford | Oct. 21, 1913 |
| 2,870,887 | Cole et al. | Jan. 27, 1959 |

FOREIGN PATENTS

| 88,935 | Switzerland | Apr. 1, 1921 |